US012133257B2

(12) United States Patent
Pan et al.

(10) Patent No.: US 12,133,257 B2
(45) Date of Patent: Oct. 29, 2024

(54) UPLINK TRANSMISSION METHOD, USER EQUIPMENT, AND NETWORK-SIDE DEVICE

(71) Applicant: VIVO MOBILE COMMUNICATION CO., LTD., Chang'an Dongguan (CN)

(72) Inventors: Xueming Pan, Chang'an Dongguan (CN); Kai Wu, Chang'an Dongguan (CN); Lei Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 627 days.

(21) Appl. No.: 17/241,634

(22) Filed: Apr. 27, 2021

(65) Prior Publication Data

US 2021/0251005 A1 Aug. 12, 2021

Related U.S. Application Data

(63) Continuation of application No. PCT/CN2019/113591, filed on Oct. 28, 2019.

(30) Foreign Application Priority Data

Nov. 2, 2018 (CN) .......................... 201811303706.X

(51) Int. Cl.
*H04W 74/0816* (2024.01)
*H04L 27/26* (2006.01)
(Continued)

(52) U.S. Cl.
CPC ..... *H04W 74/0816* (2013.01); *H04L 27/2607* (2013.01); *H04W 72/0446* (2013.01);
(Continued)

(58) Field of Classification Search
CPC ......... H04W 74/0816; H04W 72/0446; H04W 72/1268; H04W 72/535; H04W 74/004; H04L 27/2607

See application file for complete search history.

(56) References Cited

U.S. PATENT DOCUMENTS

| 2017/0332440 A1* | 11/2017 | Xu ........................ H04L 67/104 |
| 2019/0013905 A1 | 1/2019 | Yang et al. |
| 2020/0059961 A1* | 2/2020 | Do ..................... H04W 74/0808 |

FOREIGN PATENT DOCUMENTS

| CN | 108476114 A | 8/2018 |
| WO | 2017193971 A1 | 11/2017 |

(Continued)

OTHER PUBLICATIONS

Singapore first Office Action related to SG Application No. 11202104392P reported on Dec. 12, 2022.
(Continued)

*Primary Examiner* — Huy D Vu
*Assistant Examiner* — Robert Ma
(74) *Attorney, Agent, or Firm* — von Briesen & Roper, s.c.

(57) ABSTRACT

This disclosure provides an uplink transmission method, user equipment, and a network-side device. The uplink transmission method applied to user equipment includes: receiving a scheduling instruction transmitted by a network-side device, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB; performing clear channel detection for the scheduled bandwidth; determining a PRB for data transmission in the interlace of resource blocks based on a detection (Continued)

result of the clear channel detection; and transmitting data by using the PRB for data transmission.

10 Claims, 8 Drawing Sheets

(51) Int. Cl.
  *H04W 72/0446* (2023.01)
  *H04W 72/1268* (2023.01)
  *H04W 72/50* (2023.01)
  *H04W 74/00* (2009.01)
(52) U.S. Cl.
  CPC ..... *H04W 72/1268* (2013.01); *H04W 72/535* (2023.01); *H04W 74/004* (2013.01)

(56) References Cited

FOREIGN PATENT DOCUMENTS

| WO | 2017196853 A1 | 11/2017 |
| WO | 2019137777 A1 | 7/2019 |

OTHER PUBLICATIONS

Ericsson "Frame structure for NR-U", Oct. 8-12, 2018, 3GPP TSG-RAN WG1 Meeting #94bis, Chengdu, China.
Japanese Reasons For Refusal Office Action related to JP Application No. 2021-523168 reported on May 27, 2022.
International Search Report & Written Opinion related to Application No. PCT/CN2019/113591; reported on May 14, 2021.
First Chinese Office Action for related Application No. 201811303706.X; reported on Jan. 4, 2021.
Huawei, Hisilicon, "Numerology and wideband operation in NR unlicensed", Apr. 16-20, 2018, 3GPP TSG RAN WG1 Meeting #92bis, Sanya, China.
Huawei, Hisilicon, "UL PHY channels for NR unlicensed", May 21-25, 2018, 3GPP TSG RAN WG1 Meeting #93, Busan, Korea.
Oppo, "Considerations on UL signals and channels for NR-U", Oct. 8-12, 2018, 3GPP TSG RAN WG1 Meeting #94bis, Chengdu, China.
ZTE, ZTE Microelectronics, "Considerations on NR spectrum utilization and guard band using fractional PRB". Jan. 19, 2017, 3GPP TSG-RAN WG4 NR AH Meeting, Spokane, Washington, USA.
Extended European Search Report for related Application No. 19879654.2; reported on Dec. 14, 2021.
Nokia, Nokia Shanghai Bell, "On uplink signal and channel structures for NR-U", May 21-25, 2018, 3GPP TSG RAN WG1 Meeting #93, Busan, South Korea, R1-1806107.
RI-1810123—Huawei, HiSilicon "NR numerology and frame structure for unlicensed bands", 3GPP TSG RAN WG1 Meeting #94bis, Chengdu, China, Oct. 8-Oct. 12, 2018.
RI-1808060—Huawei, HiSilicon "UL PHY channels for NR unlicensed", 3GPP TSG RAN WG1 Meeting #94, Gothenburg, Sweden, Aug. 20-Aug. 24, 2018.
First Korean Office Action related to Application No. 10-2021-7016715; reported on Apr. 19, 2024.

\* cited by examiner

UPLINK TRANSMISSION METHOD, USER EQUIPMENT, AND NETWORK-SIDE DEVICE

CROSS-REFERENCE TO RELATED APPLICATIONS

This application is a continuation application of International Application No. PCT/CN2019/113591 filed on Oct. 28, 2019, which claims priority to Chinese Patent Application No. 201811303706.X filed in China on Nov. 2, 2018, both disclosures of which are incorporated herein by reference in their entireties.

TECHNICAL FIELD

This disclosure relates to the field of communications technologies, and in particular, to an uplink transmission method, user equipment, and a network-side device.

BACKGROUND

When uplink transmission is performed in an unlicensed band, an interlace of resource blocks is allocated as a basic resource unit for uplink transmission. In the related art, a communications system running in an unlicensed band runs on a carrier with a bandwidth of 20 MHz. Because a guard band is not usable, the guard band needs to be excluded from the design of interlaced resource blocks. However, in a 5G communications system, a communications system running in an unlicensed band can run on a carrier with a relatively large bandwidth, and thus it is possible that a guard band is usable. Therefore, if the design of interlaced resource blocks in the related art is still used, the usable guard band still cannot be used, resulting in low utilization of transmission resources in an unlicensed band.

SUMMARY

According to a first aspect, an embodiment of this disclosure provides an uplink transmission method applied to user equipment, where the method includes:
  receiving a scheduling instruction transmitted by a network-side device, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;
  performing clear channel detection for the scheduled bandwidth;
  determining a PRB for data transmission in the interlace of resource blocks based on a detection result of the clear channel detection; and
  transmitting data by using the PRB for data transmission.

According to a second aspect, an embodiment of this disclosure provides an uplink transmission method applied to a network-side device, where the method includes:
  transmitting a scheduling instruction, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;
  determining a PRB for data transmission in the interlace of resource blocks; and
  decoding the PRB for data transmission.

According to a third aspect, an embodiment of this disclosure provides user equipment, including:
  a receiving module, configured to receive a scheduling instruction transmitted by a network-side device, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;
  a detection module, configured to perform clear channel detection for the scheduled bandwidth;
  a determining module, configured to determine a PRB for data transmission in the interlace of resource blocks based on a detection result of the clear channel detection; and
  a transmission module, configured to transmit data by using the PRB for data transmission.

According to a fourth aspect, an embodiment of this disclosure provides a network-side device, including:
  a transmitting module, configured to transmit a scheduling instruction, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;
  a determining module, configured to determine a PRB for data transmission in the interlace of resource blocks; and
  a decoding module, configured to decode the PRB for data transmission.

According to a fifth aspect, an embodiment of this disclosure provides user equipment, including a memory, a processor, and a computer program stored in the memory and capable of running on the processor, where when the computer program is executed by the processor, the steps of the uplink transmission method provided in the first aspect of the embodiments of this disclosure are implemented.

According to a sixth aspect, an embodiment of this disclosure provides a network-side device, including a memory, a processor, and a computer program stored in the memory and capable of running on the processor, where when the computer program is executed by the processor, the steps of the uplink transmission method provided in the second aspect of the embodiments of this disclosure are implemented.

According to a seventh aspect, an embodiment of this disclosure provides a computer-readable storage medium, where the computer-readable storage medium stores a computer program, and when the computer program is executed by a processor, the steps of the uplink transmission method provided in the first aspect of the embodiments of this disclosure are implemented, or when the computer program is executed by a processor, the steps of the uplink transmission method provided in the second aspect of the embodiments of this disclosure are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, terms such as "an example" or "for example" are used to represent giving an example, an instance, or an illustration. Any embodiment or design solution described as "an example" or "for example" in the embodiments of this disclosure shall not be interpreted as being more preferred or advantageous than other embodiments or design solutions. Specifically, the terms such as "an example" or "for example" are used to present related concepts in a specific manner.

The following describes the embodiments of this disclosure with reference to the accompanying drawings. An uplink transmission method provided in the embodiments of this disclosure may be applied to a wireless communications system. The wireless communications system may be a 5G system, or an evolved long term evolution (Evolved Long Term Evolution, eLTE) system, or a later evolved communications system. A communications device in this communications system may be user equipment or a network-side device.

Figure 1:
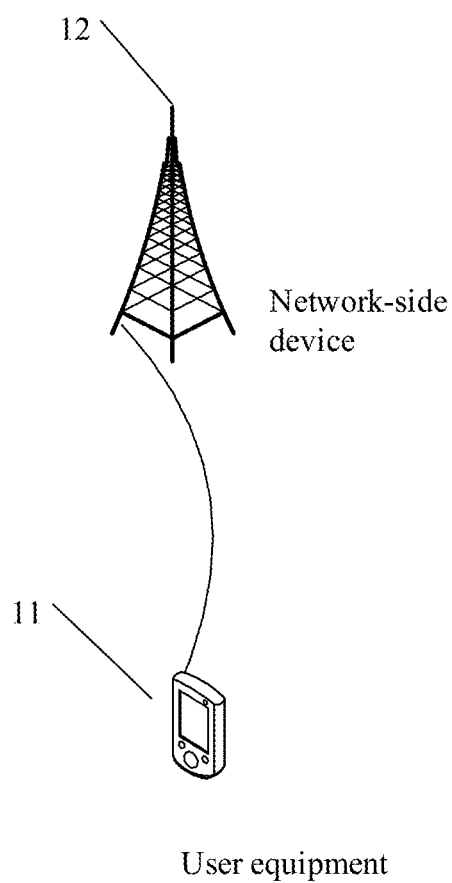
FIG. 1 is a system diagram of an uplink transmission system according to an embodiment of this disclosure.

FIG. 1 is a structural diagram of an uplink transmission system according to an embodiment of this disclosure. As shown in FIG. 1, the uplink transmission system includes user equipment 11 and a network-side device 12. The user equipment 11 may be a mobile communications device, such as a mobile phone, a tablet computer (Tablet Computer), a laptop computer (Laptop Computer), a personal digital assistant (personal digital assistant, PDA for short), a mobile internet device (Mobile Internet Device, MID), or a wearable device (Wearable Device). It should be noted that a specific type of the user equipment 11 is not limited in the embodiments of this disclosure. The network-side device 12 may be a 5G network-side device (for example, a gNB or a 5G NR NB), a 4G network-side device (for example, an eNB), a 3G network-side device (for example, an NB), a network-side device in a later evolved communications system, or the like. It should be noted that a specific type of the network-side device 12 is not limited in the embodiments of this disclosure.

Before the embodiments of this disclosure are detailed, a new radio access technology in an unlicensed band (New RAT Un-licensed, NR-U) is briefly introduced as follows.

When a 5G system runs in an unlicensed band, before transmitting a signal, a transmit end needs to perform clear channel assessment (Clear Channel Assess, CCA)/extended clear channel assessment (Extended Clear Channel Assess, eCCA) to detect whether a channel is occupied (or clear), that is, perform energy detection (Energy Detection, ED). Transmission can be started only when energy is lower than a specific threshold and the channel is determined to be clear. The foregoing clear channel detection procedure is a listen before talk (Listen Before Talk, LBT) procedure.

In addition, an interlaced (interlace) resource block design of a communications system running in an unlicensed band is briefly introduced as follows.

A maximum operating bandwidth of a 4G communications system running in an unlicensed band is 20 MHz. Because a guard band is not available, an available physical resource block (Physical Resource Block, PRB) does not include a guard band PRB. Therefore, in design of interlaced resource blocks, the guard band PRB needs to be excluded.

A maximum operating bandwidth of a 5G communications system in a licensed band may be up to 100 MHz. Naturally, a large-bandwidth carrier (such as 80 MHz) may also be used in an unlicensed band. However, LBT is usually performed on a 20 MHz subband. When two adjacent subbands have clear channels, a guard band between them can be used. In this way, if design of interlaced resource blocks excludes the guard band PRB, an available guard band cannot be used. As a result, transmission resource utilization in an unlicensed band is low.

To resolve the above-mentioned problem, an embodiment of this disclosure provides an uplink transmission system shown in FIG. 1, and an uplink transmission method applied to the uplink transmission system. The method is as follows:

transmitting, by a network-side device, a scheduling instruction, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;

receiving, by user equipment, the scheduling instruction transmitted by the network-side device;

performing, by the user equipment, clear channel detection for the scheduled bandwidth;

determining, by the user equipment, a PRB for data transmission in the interlace of resource blocks based on a detection result of the clear channel detection;

transmitting, by the user equipment, data by using the PRB for data transmission;

determining, by the network-side device, a PRB for data transmission in the interlace of resource blocks; and decoding, by the network-side device, the PRB for data transmission.

In this embodiment of this disclosure, the guard band PRB is used as the interlace of resource blocks, and the PRB for data transmission is determined based on the result of the clear channel detection for the scheduled bandwidth, so that the guard band PRB can be used for data transmission, thereby increasing transmission resource utilization in an unlicensed band.

Figure 2:
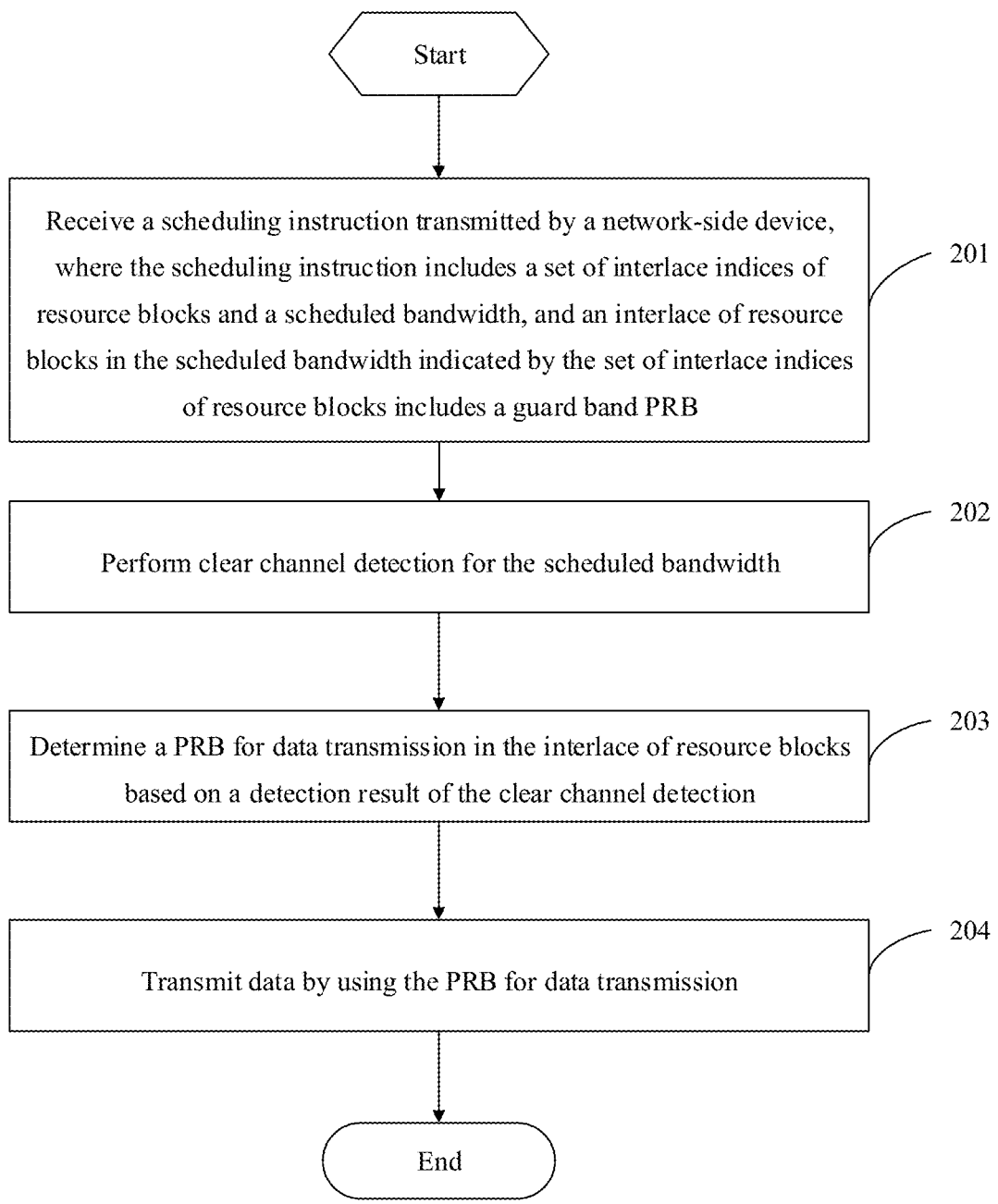
FIG. 2 is a flowchart of an uplink transmission method according to an embodiment of this disclosure.

FIG. 2 is a flowchart of an uplink transmission method according to an embodiment of this disclosure. As shown in FIG. 2, the uplink transmission method is applied to user equipment and includes the following steps:

Step 201: Receive a scheduling instruction transmitted by a network-side device, where the scheduling instruction includes a set of interlace indices of resource blocks and a scheduled bandwidth.

An interlace of resource blocks in the scheduled bandwidth indicated by the set of interlace indices of resource blocks includes a guard band PRB.

Step 202: Perform clear channel detection for the scheduled bandwidth.

In this step, the user equipment performs clear channel detection for the scheduled bandwidth before scheduling time. In this step, by performing clear channel detection for the scheduled bandwidth, the user equipment can learn a clear LBT bandwidth in the scheduled bandwidth, and therefore learn whether the scheduled bandwidth includes an available guard band PRB.

Step 203: Determine a PRB for data transmission in the interlace of resource blocks based on a detection result of the clear channel detection.

In step 202, by performing clear channel detection for the scheduled bandwidth, the user equipment can learn whether the scheduled bandwidth includes an available guard band PRB. Therefore, in this step, the user equipment can determine the PRB for data transmission in the interlace of resource blocks based on the detection result of the clear channel detection.

If the scheduled bandwidth includes an available guard band PRB, the PRB for data transmission in the interlace of resource blocks may include the guard band PRB; and if the scheduled bandwidth does not include an available guard band PRB, the PRB for data transmission in the interlace of resource blocks does not include the guard band PRB.

Step 204: Transmit data by using the PRB for data transmission.

In this embodiment of this disclosure, the guard band PRB is used as the interlace of resource blocks, and the PRB for data transmission is determined based on the result of the clear channel detection for the scheduled bandwidth, so that the guard band PRB can be used for data transmission, thereby increasing transmission resource utilization in an unlicensed band.

In this embodiment of this disclosure, in the step 203, the following manners may be used to determine the PRB for data transmission in the interlace of resource blocks:

if the detection result of the clear channel detection indicates that successfully detected LBT channels include adjacent LBT channels, determining that the PRB for data transmission in the interlace of resource blocks includes a first PRB, where the first PRB is a guard band PRB between the adjacent LBT channels.

Because a guard band between adjacent consecutive carriers is available, when two adjacent subbands have clear channels, the guard band between them may be used. In this case, the guard band PRB between the adjacent LBT channels may be used as the PRB for data transmission in the interlace of resource blocks, so that the guard band PRB between the adjacent LBT channels can be used for data transmission, thereby increasing transmission resource utilization in an unlicensed band.

Optionally, a plurality of interlaces of resource blocks are indexed in terms of all PRBs on an entire carrier bandwidth.

The determining a PRB for data transmission in the interlace of resource blocks based on a detection result of the clear channel detection includes:

selecting, from an interlace of resource blocks indicated by the set of interlace indices of resource blocks in the entire carrier bandwidth, candidate PRBs in the scheduled bandwidth; and determining the PRB for data transmission from the candidate PRBs based on the detection result of the clear channel detection.

This implementation provides a new design method for interlaced resource blocks. For a 5G communications system running in an unlicensed band, when an available guard band is included, interlaced resource block design is performed for all PRBs based on a carrier bandwidth, and a fixed index is assigned to each interlaced resource block. In other words, all the PRBs on the entire carrier bandwidth are indexed as interlaced resource blocks.

In the above-mentioned design method for interlaced resource blocks, the candidate PRB in the scheduled bandwidth is selected from the interlace of resource blocks indicated by the set of interlace indices of resource blocks in the entire carrier bandwidth; and then the PRB for data transmission is determined from the candidate PRBs based on the detection result of the clear channel detection.

Figure 3:
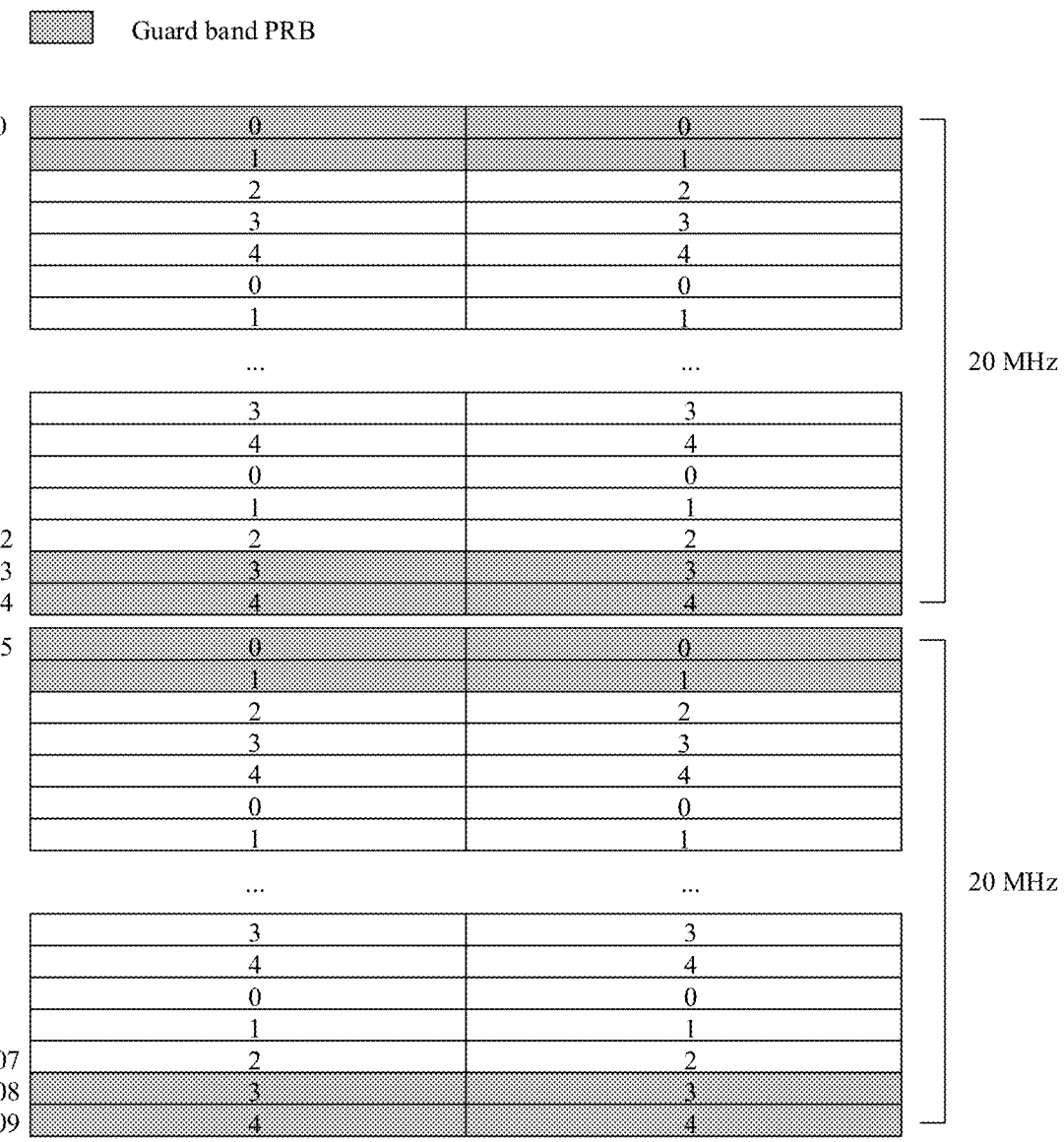
FIG. 3 is a schematic diagram of a set of interlace indices of resource blocks design according to an embodiment of this disclosure.

Assuming that the carrier bandwidth for the 5G communications system running in the unlicensed band is 40 MHz and a subcarrier spacing is 30 kHz, the interlace of resource blocks design is performed based on the 40 MHz carrier bandwidth, as shown in FIG. 3. Assuming that the scheduled bandwidth allocated to the user equipment in the scheduling instruction transmitted by the network-side device is 40 MHZ, and the set of interlace indices of resource blocks is interlace #0. When the guard band PRB is included, PRBs represented by interlace #0 are 22 PRBs in total: PRB #0, PRB #5, PRB #10, . . . , PRB #105; and when the guard band PRB is not included, PRBs represented by interlace #0 need to exclude two PRBs, PRB #0 and PRB #55, from the 22 PRBs, that is, a quantity of PRBs represented by interlace #0 is 20.

In the above example, the scheduled bandwidth is exactly equal to the carrier bandwidth. Alternatively, the carrier bandwidth may be greater than the scheduled bandwidth. For example, the carrier bandwidth is 60 MHz, and the scheduled bandwidth allocated to the user equipment in the scheduling instruction transmitted by the network-side device is 40 MHz.

In this embodiment of this disclosure, the scheduling instruction transmitted by the network-side device may further include indication information in addition to the set of interlace indices of resource blocks and the scheduled bandwidth, where the indication information is used to indicate whether the guard band PRB is allowed to be used.

The indication information may be used to indicate that the guard band PRB is completely disabled to be used.

In scheduling of multiple time domain resources, the indication information may be used to indicate at least one of the following:

the guard band PRB is disabled to be used on a first time domain resource; and the guard band PRB is allowed to be used on a second time domain resource.

In scheduling of multiple time domain resources, it can be specified that the guard band PRB is disabled to be used for the first N time domain resources, and the guard band PRB is allowed to be used starting from the $(N+1)^{th}$ time domain resource. In other words, the indication information may be further used to indicate that the guard band PRB is disabled to be used on the first time domain resource and that the guard band PRB is allowed to be used on the second time domain resource.

The first time domain resource and the second time domain resource are consecutive time domain resources in time domain.

The above-mentioned time domain resources may each include at least one slot.

In this embodiment of this disclosure, before step 204, the user equipment may also prepare data according to the scheduling instruction transmitted by the network-side device, so that the user equipment transmits the data by using the PRB for data transmission in step 204. The data prepared by the user equipment includes data finally transmitted by the user equipment.

The user equipment may prepare data according to the scheduling instruction by using the following implementations.

In an implementation, if the scheduled bandwidth is less than or equal to an LBT bandwidth, the guard band PRB is disabled to be used, a transport block size (Transport Block Size, TBS for short) is calculated, and data corresponding to the transport block size is prepared.

If the scheduled bandwidth is less than or equal to the LBT bandwidth (for example, 20 MHz), the scheduled bandwidth includes at most one detected LBT channel. In order not to affect transmission of an adjacent carrier, the guard band needs to be disabled to be used, and the guard band PRB should be excluded from the PRB for data transmission in the interlace of resource blocks. The user equipment calculates the transport block size, and prepares the data corresponding to the transport block size based on the scheduling information.

In another implementation, if the scheduled bandwidth is greater than or equal to the LBT bandwidth, and the indication information is used to indicate that the guard band PRB is disabled to be used on the first time domain resource, or the indication information is used to indicate that the guard band PRB is completely disabled to be used, a plurality of candidate transport block sizes are calculated based on a quantity of possibly detected LBT bandwidths in the scheduled bandwidth, and a plurality of versions of data respectively corresponding to the plurality of candidate transport block sizes are prepared, where the transmitted data is one of the plurality of versions of data determined based on the detection result.

In another implementation, if the scheduled bandwidth is greater than or equal to the LBT bandwidth, and the indication information is used to indicate that the guard band PRB is allowed to be used on the second time domain resource, a plurality of candidate transport block sizes are calculated based on a predicted PRB in the interlace of resource blocks on the second time domain resource or a time domain resource after the second time domain resource, and a plurality of versions of data corresponding to the plurality of candidate transport block sizes are prepared, where the predicted PRB is determined based on positions and/or a quantity of possibly detected LBT bandwidths in the scheduled bandwidth, and the transmitted data is one of the plurality of versions of data determined based on the detection result.

When the predicted PRB is determined based on the quantity of possibly detected LBT bandwidths in the scheduled bandwidth, an example is as follows: In uplink scheduling, assuming that the network-side device schedules a user terminal and indicates that a scheduled bandwidth is 40 MHz and an LBT bandwidth is 20 MHz, the scheduled bandwidth includes two LBT bandwidths. If the quantity of possibly detected LBT bandwidths is two, it may indicate that the two possibly detected LBT bandwidths are adjacent bandwidths, so that it can be determined that a guard band PRB between the two LBT bandwidths is available. If the quantity of possibly detected LBT bandwidths is one, it can be determined that a guard band PRB between the two LBT bandwidths is not available.

When the predicted PRB is determined based on the positions of the possibly detected LBT bandwidths in the scheduled bandwidth, an example is as follows: In uplink scheduling, assuming that the network-side device schedules a user terminal and indicates that a scheduled bandwidth is 60 MHz and an LBT bandwidth is 20 MHz, the scheduled bandwidth includes three LBT bandwidths. If the possibly detected LBT bandwidths are the $1^{st}$ LBT bandwidth and the $2^{nd}$ LBT bandwidth, it can indicate that the possibly detected two LBT bandwidths are adjacent bandwidths, so that it can be determined that a guard band PRB between the $1^{st}$ LBT bandwidth and the $2^{nd}$ LBT bandwidth is available. If the positions of the possibly detected LBT bandwidths are the $1^{st}$ LBT bandwidth and the $3^{rd}$ LBT bandwidth, it can be determined that a guard band PRB is not available.

When the predicted PRB is determined based on the positions and the quantity of possibly detected LBT bandwidths in the scheduled bandwidth, an example is as follows: In uplink scheduling, assuming that the network-side device schedules a user terminal and indicates that a scheduled bandwidth is 60 MHz and an LBT bandwidth is 20 MHz, the scheduled bandwidth includes three LBT bandwidths. If the quantity of possibly detected LBT bandwidths is two and the positions of the LBT bandwidths are the $1^{st}$ LBT bandwidth and the $2^{nd}$ LBT bandwidth, it can indicate that the two possibly detected LBT bandwidths are adjacent bandwidths, so that it can be determined that a guard band PRB between the $1^{st}$ LBT bandwidth and the $2^{nd}$ LBT bandwidth is available. If the quantity of possibly detected LBT bandwidths is two and the positions of the LBT bandwidths are the $1^{st}$ LBT bandwidth and the $3^{rd}$ LBT bandwidth, it can be determined that a guard band PRB is not available.

In another implementation, if the scheduled bandwidth is greater than or equal to the LBT bandwidth, and the indication information is used to indicate that the guard band PRB is disabled to be used on the first time domain resource and that the guard band PRB is allowed to be used on the second time domain resource, on the first time domain resource, a plurality of candidate transport block sizes are calculated based on a quantity of possibly detected LBT bandwidths in the scheduled bandwidth, and a plurality of versions of data respectively corresponding to the plurality of candidate transport block sizes are prepared; and on the second time domain resource or a time domain resource after the second time domain resource, data is prepared based on a successfully detected LBT bandwidth in the scheduled bandwidth on the first time domain resource.

Using FIG. 3 as an example, in the uplink scheduling, the network-side device schedules the user terminal and indicates that the scheduled bandwidth is 40 MHz, that the set of interlace indices of resource blocks is interlace #0, that the guard band is disabled to be used in a first transmission slot, and that the guard band starts to be used from a second transmission slot. After receiving the scheduling instruction, the user equipment starts to prepare two candidate transport block sizes, and LBT is successful on one or two LBT channels (20 MHz), respectively corresponding to 10 PRBs or 20 PRBs when the guard band is not included. In this case, the user equipment starts to monitor the channel. Assuming that two carrier bandwidths are detected before scheduling time, the user equipment transmits data corresponding to the size of 20 PRBs. Starting from the second slot, the user equipment starts to use the guard band and transmit data corresponding to the size of 22 PRBs.

Optionally, the determining a PRB for data transmission in the interlace of resource blocks based on a detection result of the clear channel detection includes:
    determining a punctured PRB in the interlace of resource blocks based on the detection result of the clear channel detection, where the PRB for data transmission in the interlace of resource blocks does not include the punctured PRB.

In this implementation, the user equipment calculates the transport block sizes for the specified interlaced resource block index on the entire scheduled bandwidth (including a possibly used guard bandwidth), and then punctures, based on a clear channel condition, a PRB that cannot be transmitted. In this implementation, the user terminal does not need to prepare a plurality of versions of data, but the data transmission may fail on the punctured PRB and the data needs to be retransmitted.

In this embodiment of this disclosure, the guard band PRB is used as the interlace of resource blocks, and the PRB for data transmission is determined based on the result of the clear channel detection for the scheduled bandwidth, so that the guard band PRB can be used for data transmission, thereby increasing transmission resource utilization in an unlicensed band.

Figure 4:
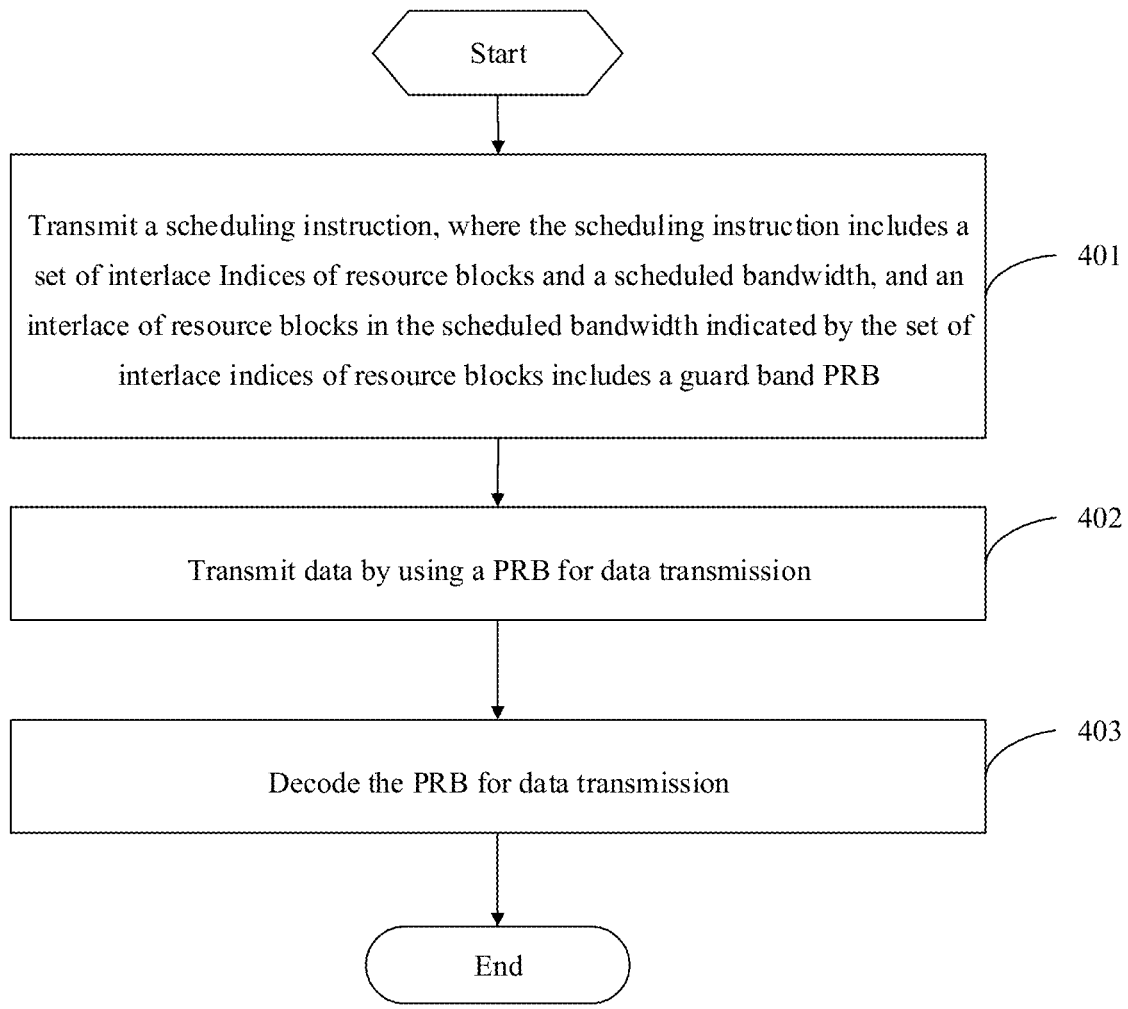
FIG. 4 is a flowchart of another uplink transmission method according to an embodiment of this disclosure.

FIG. 4 is a flowchart of an uplink transmission method according to an embodiment of this disclosure. As shown in FIG. 4, the uplink transmission method is applied to a network-side device and includes the following steps:
    Step 401: Transmit a scheduling instruction, where the scheduling instruction includes a set of interlace indices of resource blocks and a scheduled bandwidth.

An interlace of resource blocks in the scheduled bandwidth indicated by the set of interlace indices of resource blocks includes a guard band physical resource block PRB.
    Step 402: Determine a PRB for data transmission in the interlace of resource blocks.

In this step, the network-side device can receive uplink data on a scheduled resource, detect an actual transmission bandwidth of transmitted data, and adaptively determine a quantity of PRBs for data transmission in the interlace of resource blocks, thereby determining an actual transport block size.

The actual transmission bandwidth for data transmission may be detected through a demodulation reference signal (Demodulation Reference Signal, DMRS).
    Step 403: Decode the PRB for data transmission.

In this step, the network-side device decodes the PRB for data transmission based on the determined transport block size and scheduling information, so as to decode data.

Optionally, a plurality of interlaces of resource blocks are indexed in terms of all PRBs on an entire carrier bandwidth.

The determining a PRB for data transmission in the interlace of resource blocks includes:
    selecting, from an interlace of resource blocks indicated by the set of interlace indices of resource blocks in the entire carrier bandwidth, candidate PRBs in the scheduled bandwidth; and
    determining the PRB for data transmission from the candidate PRBs.

Optionally, the determining a PRB for data transmission in the interlace of resource blocks includes:
    if a transmission bandwidth for data transmission includes adjacent LBT channels, determining that the PRB for data transmission in the interlace of resource blocks includes a first PRB, where the first PRB is a guard band PRB between the adjacent LBT channels.

Optionally, the scheduling instruction further includes indication information, and the indication information is used to indicate whether the guard band PRB is allowed to be used.

Optionally, the indication information is used to indicate at least one of the following:
    the guard band PRB is disabled to be used on a first time domain resource; and
    the guard band PRB is allowed to be used on a second time domain resource;
    or
    the indication information is used to indicate that the guard band PRB is completely disabled to be used.

Optionally, the indication information is used to indicate that the guard band PRB is disabled to be used on a first time domain resource and that the guard band PRB is allowed to be used on a second time domain resource.

The first time domain resource and the second time domain resource are consecutive time domain resources in time domain.

In this embodiment of this disclosure, determining the actual transport block size may include the following implementations.

In an implementation, if the guard band is not allowed to be used on the time domain resource, the quantity of PRBs for data transmission is determined based on the actual transmission bandwidth and the set of interlace indices of resource blocks, to calculate the transport block size.

In another implementation, if the guard band is allowed to be used on the time domain resource (for example, a slot slot resource), it is necessary to determine, based on the actual transmission bandwidth, which guard bands can be used. To be specific, if adjacent LBT channels both have data to be transmitted, the guard band between the adjacent LBT channels is available. The quantity of PRBs for data transmission is determined based on the scheduled interlaced resource block index, the actual transmission bandwidth, and whether the guard band is used, to calculate the transport block size.

It should be noted that for specific implementations of this embodiment of this disclosure as an embodiment of the network-side device corresponding to the embodiment shown in FIG. 2, reference may be made to the relevant descriptions about the embodiment shown in FIG. 2, and the same beneficial effect can be achieved. To avoid repetition, details are not described herein again.

Figure 5:
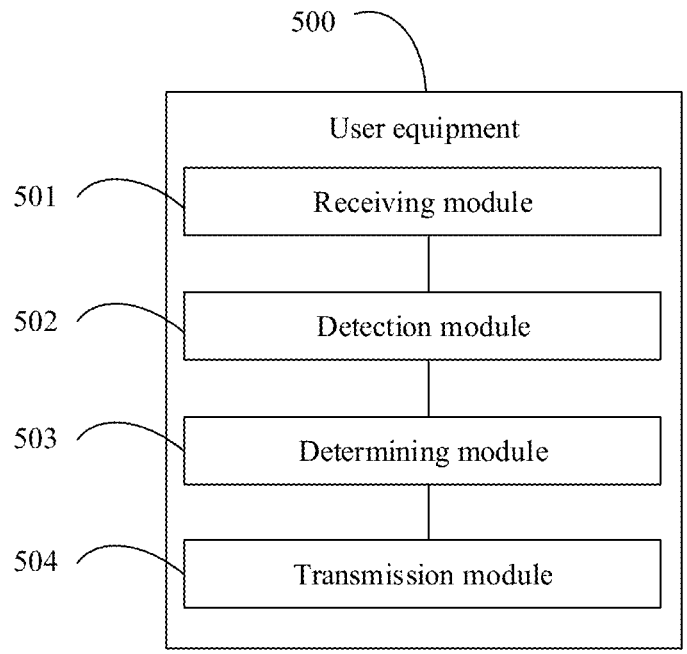
FIG. 5 is a structural diagram of user equipment according to an embodiment of this disclosure.

FIG. 5 is a structural diagram of user equipment according to an embodiment of this disclosure. As shown in FIG. 5, the user equipment 500 includes:
- a receiving module 501, configured to receive a scheduling instruction transmitted by a network-side device, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;
- a detection module 502, configured to perform clear channel detection for the scheduled bandwidth;
- a determining module 503, configured to determine a PRB for data transmission in the interlace of resource blocks based on a detection result of the clear channel detection; and
- a transmission module 504, configured to transmit data by using the PRB for data transmission.

Optionally, a plurality of interlaces of resource blocks are indexed in terms of all PRBs on an entire carrier bandwidth.

The determining module 503 is specifically configured to:
- select, from an interlace of resource blocks indicated by the set of interlace indices of resource blocks in the entire carrier bandwidth, candidate PRBs in the scheduled bandwidth; and
- determine the PRB for data transmission from the candidate PRBs based on the detection result of the clear channel detection.

Optionally, the determining module 503 is specifically configured to:
- if the detection result of the clear channel detection indicates that successfully detected listen before talk LBT channels include adjacent LBT channels, determine that the PRB for data transmission in the interlace of resource blocks includes a first PRB, where the first PRB is a guard band PRB between the adjacent LBT channels.

Figure 6:
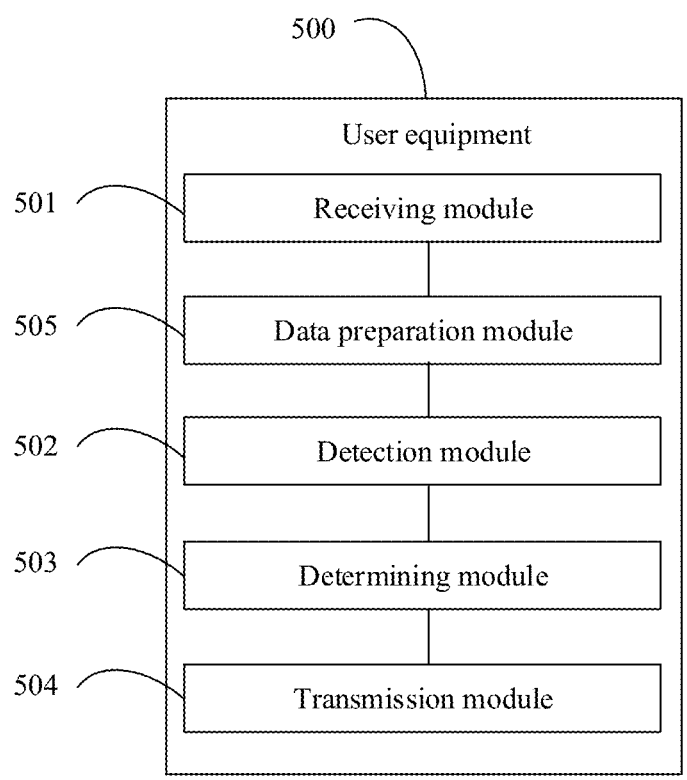
FIG. 6 is a structural diagram of another user equipment according to an embodiment of this disclosure.

Optionally, as shown in FIG. 6, the user equipment 500 further includes:
- a data preparation module 505, configured to prepare data according to the scheduling instruction, where the prepared data includes the transmitted data.

Optionally, the data preparation module 505 is specifically configured to:
- if the scheduled bandwidth is less than or equal to an LBT bandwidth, disable the use of the guard band PRB, calculate a transport block size, and prepare data corresponding to the transport block size.

Optionally, the scheduling instruction further includes indication information, and the indication information is used to indicate whether the guard band PRB is allowed to be used.

Optionally, the indication information is used to indicate at least one of the following:
- the guard band PRB is disabled to be used on a first time domain resource; and
- the guard band PRB is allowed to be used on a second time domain resource;
or
- the indication information is used to indicate that the guard band PRB is completely disabled to be used.

Optionally, the indication information is used to indicate that the guard band PRB is disabled to be used on a first time domain resource and that the guard band PRB is allowed to be used on a second time domain resource; and the first time domain resource and the second time domain resource are consecutive time domain resources in time domain.

Optionally, the scheduled bandwidth is greater than or equal to an LBT bandwidth.

The data preparation module 505 is specifically configured to:
- if the indication information is used to indicate that the guard band PRB is disabled to be used on the first time domain resource, or the indication information is used to indicate that the guard band PRB is completely disabled to be used, calculate a plurality of candidate transport block sizes based on a quantity of possibly successfully detected LBT bandwidths in the scheduled bandwidth, and prepare a plurality of versions of data respectively corresponding to the plurality of candidate transport block sizes, where
- the transmitted data is one of the plurality of versions of data determined based on the detection result.

Optionally, the scheduled bandwidth is greater than or equal to an LBT bandwidth.

The data preparation module 505 is specifically configured to:
- if the indication information is used to indicate that the guard band PRB is allowed to be used on the second time domain resource, calculate, on the second time domain resource or a time domain resource after the second time domain resource, a plurality of candidate transport block sizes based on a predicted PRB in the interlace of resource blocks, and prepare a plurality of versions of data corresponding to the plurality of candidate transport block sizes, where the predicted PRB is determined based on positions and/or a quantity of possibly detected LBT bandwidths in the scheduled bandwidth; and
- the transmitted data is one of the plurality of versions of data determined based on the detection result.

Optionally, the scheduled bandwidth is greater than or equal to an LBT bandwidth.

The data preparation module 505 is specifically configured to:
- calculate, on the first time domain resource, a plurality of candidate transport block sizes based on a quantity of possibly successfully detected LBT bandwidths in the scheduled bandwidth, and prepare a plurality of versions of data corresponding to the plurality of candidate transport block sizes; and
- prepare data on the second time domain resource or a time domain resource after the second time domain resource based on a successfully detected LBT bandwidth in the scheduled bandwidth the first time domain resource.

Optionally, the determining module 503 is specifically configured to:
- determine a punctured PRB in the interlace of resource blocks based on the detection result of the clear channel detection, where the PRB for data transmission in the interlace of resource blocks does not include the punctured PRB.

It should be noted that the user equipment 500 in this embodiment of this disclosure may be user equipment in any implementation of the method embodiments. Any implementation of the user equipment in the method embodiments can be implemented by the user equipment 500 in this embodiment of this disclosure, and the same beneficial effect can be achieved. To avoid repetition, details are not described herein again.

Figure 7:
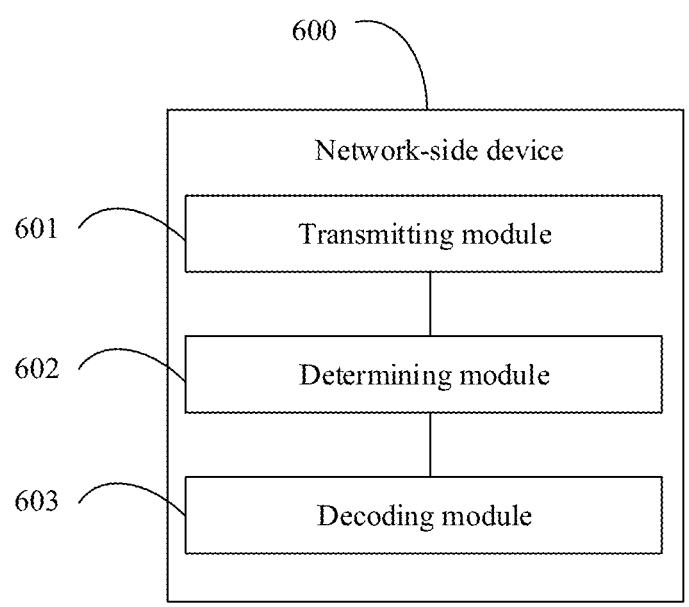
FIG. 7 is a structural diagram of a network-side device according to an embodiment of this disclosure.

FIG. 7 is a structural diagram of a network-side device according to an embodiment of this disclosure. As shown in FIG. 7, the network-side device 600 includes:

a transmitting module 601, configured to transmit a scheduling instruction, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;

a determining module 602, configured to determine a PRB for data transmission in the interlace of resource blocks; and a decoding module 603, configured to decode the PRB for data transmission.

Optionally, a plurality of interlaces of resource blocks are indexed in terms of all PRBs on an entire carrier bandwidth.

The determining module 602 is specifically configured to:

select, from an interlace of resource blocks indicated by the set of interlace indices of resource blocks in the entire carrier bandwidth, candidate PRBs in the scheduled bandwidth; and determine the PRB for data transmission from the candidate PRBs.

Optionally, the determining module 602 is specifically configured to:

if a transmission bandwidth for data transmission includes adjacent LBT channels, determine that the PRB for data transmission in the interlace of resource blocks includes a first PRB, where the first PRB is a guard band PRB between the adjacent LBT channels.

Optionally, the scheduling instruction further includes indication information, and the indication information is used to indicate whether the guard band PRB is allowed to be used.

Optionally, the indication information is used to indicate at least one of the following:

the guard band PRB is disabled to be used on a first time domain resource; and the guard band PRB is allowed to be used on a second time domain resource;

or the indication information is used to indicate that the guard band PRB is completely disabled to be used.

Optionally, the indication information is used to indicate that the guard band PRB is disabled to be used on a first time domain resource and that the guard band PRB is allowed to be used on a second time domain resource; and the first time domain resource and the second time domain resource are consecutive time domain resources in time domain.

It should be noted that the network-side device 600 in this embodiment of this disclosure may be a network-side device in any implementation of the method embodiments. Any implementation of the network-side device in the method embodiments can be implemented by the network-side device 600 in this embodiment of this disclosure, and the same beneficial effect can be achieved. To avoid repetition, details are not described herein again.

Figure 8:
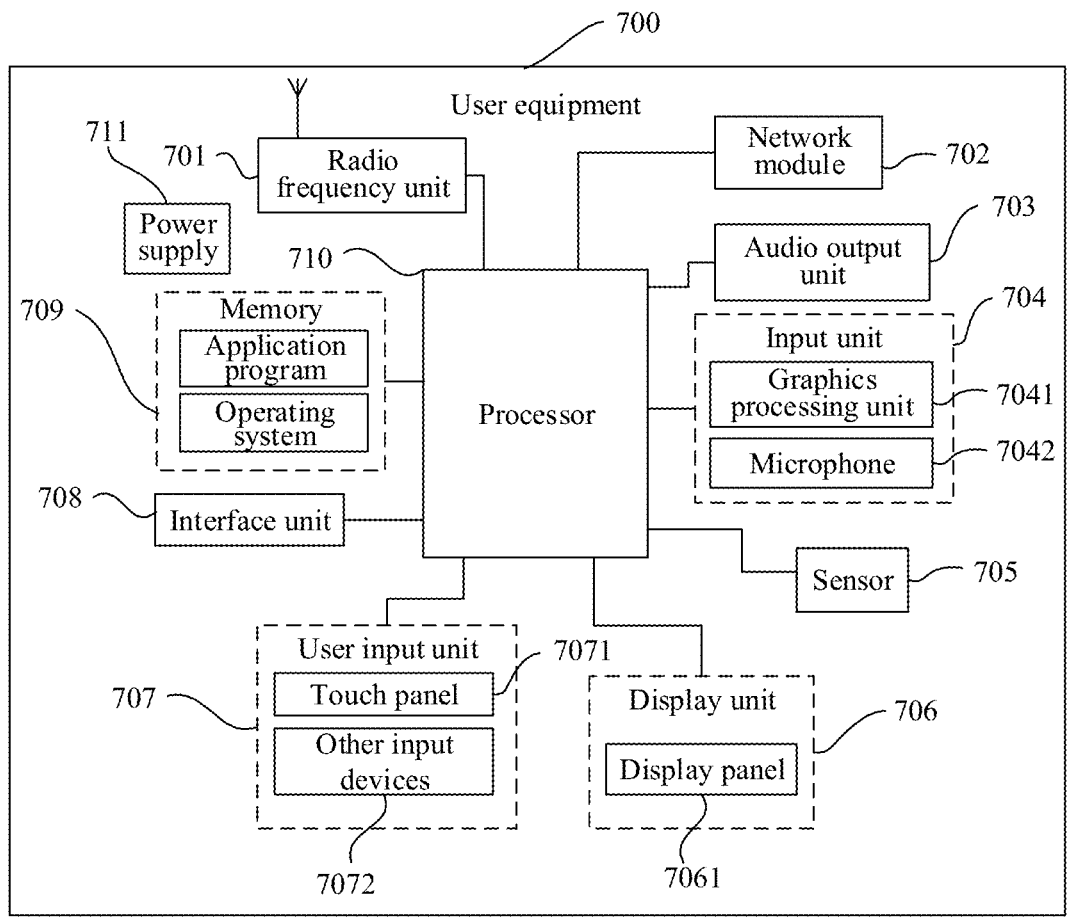
FIG. 8 is a schematic diagram of a hardware structure of user equipment according to an embodiment of this disclosure.

FIG. 8 is a schematic diagram of a hardware structure of user equipment that implements the embodiments of this disclosure. The user equipment 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. Persons skilled in the art can understand that the structure of the user equipment shown in FIG. 8 does not constitute any limitation on the user equipment. The user equipment may include more or fewer components than those shown in the figure, or may combine some components, or may have a different component arrangement. In this embodiment of this disclosure, the user equipment includes but is not limited to a mobile phone, a tablet computer, a laptop computer, a palmtop computer, in-vehicle user equipment, a wearable device, a pedometer, and the like.

The processor 710 is configured to:

receive a scheduling instruction transmitted by a network-side device, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB;

perform clear channel detection for the scheduled bandwidth;

determine a PRB for data transmission in the interlace of resource blocks based on a detection result of the clear channel detection; and transmit data by using the PRB for data transmission.

Optionally, a plurality of interlaces of resource blocks are indexed in terms of all PRBs on an entire carrier bandwidth.

The step, performed by the processor 710, of determining a PRB for data transmission in the interlace of resource blocks based on a detection result of the clear channel detection includes:

selecting, from an interlace of resource blocks indicated by the set of interlace indices of resource blocks in the entire carrier bandwidth, candidate PRBs in the scheduled bandwidth; and determining the PRB for data transmission from the candidate PRBs based on the detection result of the clear channel detection.

Optionally, the step, performed by the processor 710, of determining a PRB for data transmission in the interlace of resource blocks based on a detection result of the clear channel detection includes:

if the detection result of the clear channel detection indicates that successfully detected listen before talk LBT channels include adjacent LBT channels, determining that the PRB for data transmission in the interlace of resource blocks includes a first PRB, where the first PRB is a guard band PRB between the adjacent LBT channels.

Optionally, the processor 710 is further configured to:

prepare data according to the scheduling instruction, where the prepared data includes the transmitted data.

Optionally, the step, performed by the processor 710, of preparing data according to the scheduling instruction includes:

if the scheduled bandwidth is less than or equal to an LBT bandwidth, disabling the use of the guard band PRB, calculating a transport block size, and preparing data corresponding to the transport block size.

Optionally, the scheduling instruction further includes indication information, and the indication information is used to indicate whether the guard band PRB is allowed to be used.

Optionally, the indication information is used to indicate at least one of the following:

the guard band PRB is disabled to be used on a first time domain resource; and the guard band PRB is allowed to be used on a second time domain resource;
or
the indication information is used to indicate that the guard band PRB is completely disabled to be used.

Optionally, the indication information is used to indicate that the guard band PRB is disabled to be used on a first time domain resource and that the guard band PRB is allowed to be used on a second time domain resource; and
the first time domain resource and the second time domain resource are consecutive time domain resources in time domain.

Optionally, the scheduled bandwidth is greater than or equal to an LBT bandwidth.

The step, performed by the processor 710, of preparing data according to the scheduling instruction includes:
if the indication information is used to indicate that the guard band PRB is disabled to be used on the first time domain resource, or the indication information is used to indicate that the guard band PRB is completely disabled to be used, calculating a plurality of candidate transport block sizes based on a quantity of possibly successfully detected LBT bandwidths in the scheduled bandwidth, and preparing a plurality of versions of data respectively corresponding to the plurality of candidate transport block sizes, where
the transmitted data is one of the plurality of versions of data determined based on the detection result.

Optionally, the scheduled bandwidth is greater than or equal to an LBT bandwidth.

The step, performed by the processor 710, of preparing data according to the scheduling instruction includes:
if the indication information is used to indicate that the guard band PRB is allowed to be used on the second time domain resource, calculating, on the second time domain resource or a time domain resource after the second time domain resource, a plurality of candidate transport block sizes based on a predicted PRB in the interlace of resource blocks, and preparing a plurality of versions of data corresponding to the plurality of candidate transport block sizes, where the predicted PRB is determined based on positions and/or a quantity of possibly detected LBT bandwidths in the scheduled bandwidth; and
the transmitted data is one of the plurality of versions of data determined based on the detection result.

Optionally, the scheduled bandwidth is greater than or equal to an LBT bandwidth.

The step, performed by the processor 710, of preparing data according to the scheduling instruction includes:
calculating, on the first time domain resource, a plurality of candidate transport block sizes based on a quantity of possibly successfully detected LBT bandwidths in the scheduled bandwidth, and preparing a plurality of versions of data corresponding to the plurality of candidate transport block sizes; and
preparing data on the second time domain resource or a time domain resource after the second time domain resource based on a successfully detected LBT bandwidth in the scheduled bandwidth on the first time domain resource.

Optionally, the step, performed by the processor 710, of determining a PRB for data transmission in the interlace of resource blocks based on a detection result of the clear channel detection includes:
determining a punctured PRB in the interlace of resource blocks based on the detection result of the clear channel detection, where the PRB for data transmission in the interlace of resource blocks does not include the punctured PRB.

In this embodiment of this disclosure, the guard band PRB is used as the interlace of resource blocks, and the PRB for data transmission is determined based on the result of the clear channel detection for the scheduled bandwidth, so that the guard band PRB can be used for data transmission, thereby increasing transmission resource utilization in an unlicensed band.

It should be understood that, in this embodiment of this disclosure, the radio frequency unit 701 may be configured to transmit or receive a signal in an information transmitting/receiving or call process. Specifically, the radio frequency unit 701 receives downlink data from a base station and transmits the downlink data to the processor 710 for processing; and transmits uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communications system.

The user equipment provides a user with wireless broadband Internet access by using the network module 702, for example, helping the user send and receive emails, browse web pages, or access streaming media.

The audio output unit 703 may convert audio data into an audio signal, and output the audio signal as sound, where the audio data is received by the radio frequency unit 701 or the network module 702, or stored in the memory 709. Moreover, the audio output unit 703 may also provide an audio output (for example, a call signal reception sound or a message reception sound) related to a specific function performed by the user equipment 700. The audio output unit 703 includes a loudspeaker, a buzzer, a phone receiver, and the like.

The input unit 704 is configured to receive an audio signal or a video signal. The input unit 704 may include a graphics processing unit (Graphics Processing Unit, GPU) 7041 and a microphone 7042, and the graphics processing unit 7041 processes image data of a static picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium), or may be transmitted by the radio frequency unit 701 or the network module 702. The microphone 7042 may receive a sound and can process the sound into audio data. In a phone call mode, processed audio data may be converted, for output, into a format for transmission by the radio frequency unit 701 to a mobile communications base station.

The user equipment 700 further includes at least one sensor 705, for example, an optical sensor, a motion sensor, and other sensors. Specifically, the optical sensor includes an ambient light sensor and a proximity sensor. The ambient light sensor may adjust luminance of the display panel 7061 based on brightness of ambient light. The proximity sensor may turn off the display panel 7061 and backlight when the user equipment 700 approaches an ear. As a type of motion sensor, an accelerometer sensor may detect accelerations in various directions (usually, three axes), may detect, in a still state, a magnitude and a direction of gravity, and may be configured to recognize a user equipment posture (for example, screen switching between a landscape mode and a portrait mode, related games, and magnetometer posture calibration), implement a vibration recognition related function (for example, a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, or the like. Details are not described herein.

The display unit 706 is configured to display information entered by the user or information provided for the user. The display unit 706 may include the display panel 7061. Optionally, the display panel 7061 may be configured in a form of a liquid crystal display (Liquid Crystal Display, LCD), an organic light-emitting diode (Organic Light-Emitting Diode, OLED), or the like.

The user input unit 707 may be configured to receive entered digit or character information, and generate a key signal input related to a user setting and function control of the user equipment. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives a command transmitted by the processor 710, and executes the command. In addition, the touch panel 7071 may be implemented in a plurality of forms, for example, a resistive, capacitive, infrared, or surface acoustic wave touch panel. The user input unit 707 may further include the other input devices 7072 in addition to the touch panel 7071. Specifically, the other input devices 7072 may include but are not limited to a physical keyboard, a function key (for example, a volume control key or a power on/off key), a track ball, a mouse, and a joystick. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. In FIG. 8, the touch panel 7071 and the display panel 7061 are used as two independent components to implement input and output functions of the user equipment. In some embodiments, however, the touch panel 7071 and the display panel 7061 may be integrated to implement the input and output functions of the user equipment. Details are not limited herein.

The interface unit 708 is an interface between the external apparatus and the user equipment 700. For example, the external apparatus may include a wired or wireless headphone port, an external power supply (or battery charger) port, a wired or wireless data port, a memory card port, a port for connecting an apparatus with an identification module, an audio input/output (input/output, I/O) port, a video I/O port, a headset port, or the like. The interface unit 708 may be configured to receive an input (for example, data information or power) from the external apparatus and transmit the received input to one or more elements of the user equipment 700, or transmit data between the external apparatus and the user equipment 700.

The memory 709 may be configured to store software programs and various types of data. The memory 709 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 709 may include a high-speed random access memory, or may include a nonvolatile memory, for example, at least one magnetic disk storage device or a flash memory device, or another volatile solid-state storage device.

The processor 710, as a control center of the user equipment, is connected to all parts of the entire user equipment by using various interfaces and lines. By running or executing a software program and module that are stored in the memory 709 and invoking data stored in the memory 709, the processor 710 executes various functions of the user equipment and processes data, so as to perform overall monitoring on the user equipment. The processor 710 may include one or more processing units. Optionally, the processor 710 may integrate an application processor and a modem processor. The application processor mainly processes an operating system, a user interface, an application program, and the like. The modem processor mainly processes wireless communication. It can be understood that the modem processor may be alternatively not integrated in the processor 710.

The user equipment 700 further includes the power supply 711 (such as a battery) for supplying power to the components. Optionally, the power supply 711 may be logically connected to the processor 710 through a power management system. In this way, functions such as charge management, discharge management, and power consumption management are implemented by using the power management system.

In addition, the user equipment 700 includes some functional modules not shown. Details are not described herein.

Optionally, an embodiment of this disclosure further provides a user terminal, including a processor 710, a memory 709, and a computer program stored in the memory 709 and capable of running on the processor 710. When the computer program is executed by the processor 710, the processes of the foregoing embodiments of the uplink transmission method are implemented, with the same technical effects achieved. To avoid repetition, details are not described herein again.

FIG. 8 is a structural diagram of a network-side device according to an embodiment of this disclosure. As shown in FIG. 8, the network-side device 800 includes a processor 801, a transceiver 802, a memory 803, and a bus interface.

The transceiver 802 is configured to:
transmit a scheduling instruction, where the scheduling instruction includes a set of interlace indices of resource blocks and a scheduled bandwidth, and an interlace of resource blocks in the scheduled bandwidth indicated by the set of interlace indices of resource blocks includes a guard band physical resource block PRB.

The processor 801 is configured to:
determine a PRB for data transmission in the interlace of resource blocks; and
decode the PRB for data transmission.

Optionally, a plurality of interlaces of resource blocks are indexed in terms of all PRBs on an entire carrier bandwidth.

The step, performed by the processor 801, of determining a PRB for data transmission in the interlace of resource blocks includes:

selecting, from an interlace of resource blocks indicated by the set of interlace indices of resource blocks in the entire carrier bandwidth, candidate PRBs in the scheduled bandwidth; and determining the PRB for data transmission from the candidate PRBs.

Optionally, the step, performed by the processor 801, of determining a PRB for data transmission in the interlace of resource blocks includes:

if a transmission bandwidth for data transmission includes adjacent LBT channels, determining that the PRB for data transmission in the interlace of resource blocks includes a first PRB, where the first PRB is a guard band PRB between the adjacent LBT channels.

Optionally, the scheduling instruction further includes indication information, and the indication information is used to indicate whether the guard band PRB is allowed to be used.

Optionally, the indication information is used to indicate at least one of the following:

the guard band PRB is disabled to be used on a first time domain resource; and the guard band PRB is allowed to be used on a second time domain resource;

or the indication information is used to indicate that the guard band PRB is completely disabled to be used.

Optionally, the indication information is used to indicate that the guard band PRB is disabled to be used on a first time domain resource and that the guard band PRB is allowed to be used on a second time domain resource; and the first time domain resource and the second time domain resource are consecutive time domain resources in time domain.

Figure 9:
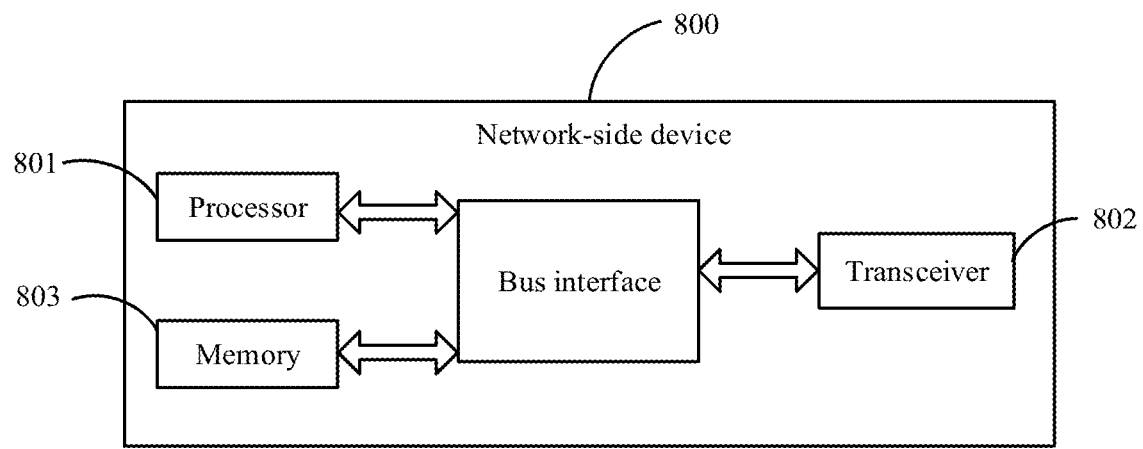
FIG. 9 is a schematic diagram of a hardware structure of a network-side device according to an embodiment of this disclosure.

In FIG. 9, a bus architecture may include any quantity of interconnected buses and bridges, and specifically connect together various circuits of one or more processors represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides interfaces. The transceiver 802 may be a plurality of components, including a transmitter and a receiver, and provides units for communicating with a variety of other apparatuses on a transmission medium. For different user equipment, the user interface 804 may also be an interface capable of externally or internally connecting a required device, and the connected device includes but is not limited to a keypad, a display, a speaker, a microphone, a joystick, and the like.

The processor 801 is responsible for management of the bus architecture and general processing, and the memory 803 may store data for use by the processor 801 when the processor 801 performs an operation.

It should be noted that the network-side device 800 in this embodiment may be a network-side device in any implementation of the method embodiments of this disclosure. Any implementation of the network-side device in the method embodiments of this disclosure can be implemented by the network-side device 800 in this embodiment, and the same beneficial effect can be achieved. Details are not described herein again.

An embodiment of this disclosure further provides a computer-readable storage medium. The computer-readable storage medium stores a computer program. When the computer program is executed by a processor, the procedures in the foregoing embodiments of the uplink transmission method corresponding to a network-side device or user equipment are implemented with the same technical effect achieved. To avoid repetition, details are not described herein again. For example, the computer-readable storage medium is a read-only memory (Read-Only Memory, ROM for short), a random access memory (Random Access Memory, RAM for short), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing user equipment (which may be a mobile phone, a computer, a server, an air conditioner, a network device, or the like) to perform the methods described in the embodiments of this disclosure.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

Persons of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be a magnetic disk, an optical disc, a read-only memory (Read-Only Memory, ROM), a random access memory (Random Access Memory, RAM for short), or the like.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The foregoing descriptions are only specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. An uplink transmission method, applied to user equipment and comprising:
   receiving a scheduling instruction transmitted by a network-side device, wherein the scheduling instruction comprises a set of interlace indices of resource blocks and a scheduled bandwidth, and an interlace of resource blocks in the scheduled bandwidth indicated by the set of interlace indices of resource blocks comprises a guard band physical resource block (PRB);
   performing clear channel detection for the scheduled bandwidth;
   determining a PRB for data transmission in the interlace of resource blocks based on a detection result of the clear channel detection; and
   transmitting data by using the PRB for data transmission;
   wherein a plurality of interlaces of resource blocks are indexed in terms of all PRBs on an entire carrier bandwidth; and
   the determining a PRB for data transmission in the interlace of resource blocks based on a detection result of the clear channel detection comprises:
   selecting, from the interlace of resource blocks indicated by the set of interlace indices of resource blocks in the entire carrier bandwidth, candidate PRBs in the scheduled bandwidth; and
   determining the PRB for data transmission from the candidate PRBs based on the detection result of the clear channel detection;
   wherein before the transmitting data by using the PRB for data transmission, the method further comprises:
   preparing data according to the scheduling instruction, wherein the prepared data comprises the transmitted data;
   wherein the scheduling instruction further comprises indication information, and the indication information is used to indicate whether the guard band PRB is allowed to be used;
   wherein
   the indication information is used to indicate at least one of the following:
   the guard band PRB is disabled to be used on a first time domain resource; and
   the guard band PRB is allowed to be used on a second time domain resource;
   or
   the indication information is used to indicate that the guard band PRB is completely disabled to be used;
   wherein the scheduled bandwidth is greater than or equal to an LBT bandwidth; and
   the preparing data according to the scheduling instruction comprises:
   if the indication information is used to indicate that the guard band PRB is disabled to be used on the first time domain resource, or the indication information is used to indicate that the guard band PRB is completely disabled to be used, calculating a plurality of candidate transport block sizes based on a quantity of possibly successfully detected LBT bandwidths in the scheduled bandwidth, and preparing a plurality of versions of data respectively corresponding to the plurality of candidate transport block sizes, wherein the transmitted data is one of the plurality of versions of data determined based on the detection result;
or,
wherein the scheduled bandwidth is greater than or equal to an LBT bandwidth; and
the preparing data according to the scheduling instruction comprises:
if the indication information is used to indicate that the guard band PRB is allowed to be used on the second time domain resource, calculating, on the second time domain resource or a time domain resource after the second time domain resource, a plurality of candidate transport block sizes based on a predicted PRB in the interlace of resource blocks, and preparing a plurality of versions of data corresponding to the plurality of candidate transport block sizes, wherein the predicted PRB is determined based on positions and/or a quantity of possibly detected LBT bandwidths in the scheduled bandwidth; and
the transmitted data is one of the plurality of versions of data determined based on the detection result.

2. The method according to claim 1, wherein the determining a PRB for data transmission in the interlace of resource blocks based on a detection result of the clear channel detection comprises:
if the detection result of the clear channel detection indicates that successfully detected listen before talk (LBT) channels comprise adjacent LBT channels, determining that the PRB for data transmission in the interlace of resource blocks comprises a first PRB, wherein the first PRB is a guard band PRB between the adjacent LBT channels.

3. The method according to claim 1, wherein the preparing data according to the scheduling instruction comprises:
if the scheduled bandwidth is less than or equal to an LBT bandwidth, disabling the use of the guard band PRB, calculating a transport block size, and preparing data corresponding to the transport block size.

4. User equipment, comprising a memory, a processor, and a computer program stored in the memory and capable of running on the processor, wherein the computer program is executed by the processor to implement:
receiving a scheduling instruction transmitted by a network-side device, wherein the scheduling instruction comprises a set of interlace indices of resource blocks and a scheduled bandwidth, and an interlace of resource blocks in the scheduled bandwidth indicated by the set of interlace indices of resource blocks comprises a guard band physical resource block (PRB);
performing clear channel detection for the scheduled bandwidth;
determining a PRB for data transmission in the interlace of resource blocks based on a detection result of the clear channel detection; and
transmitting data by using the PRB for data transmission;
wherein a plurality of interlaces of resource blocks are indexed in terms of all PRBs on an entire carrier bandwidth; and
the computer program is further executed by the processor to implement:
selecting, from the interlace of resource blocks indicated by the set of interlace indices of resource blocks in the entire carrier bandwidth, candidate PRBs in the scheduled bandwidth; and
determining the PRB for data transmission from the candidate PRBs based on the detection result of the clear channel detection;
wherein before the transmitting data by using the PRB for data transmission, the computer program is further executed by the processor to implement:
preparing data according to the scheduling instruction, wherein the prepared data comprises the transmitted data;
wherein the scheduling instruction further comprises indication information, and the indication information is used to indicate whether the guard band PRB is allowed to be used;
wherein
the indication information is used to indicate at least one of the following:
the guard band PRB is disabled to be used on a first time domain resource; and
the guard band PRB is allowed to be used on a second time domain resource;
or
the indication information is used to indicate that the guard band PRB is completely disabled to be used;
wherein the scheduled bandwidth is greater than or equal to an LBT bandwidth; and
the preparing data according to the scheduling instruction comprises:
if the indication information is used to indicate that the guard band PRB is disabled to be used on the first time domain resource, or the indication information is used to indicate that the guard band PRB is completely disabled to be used, calculating a plurality of candidate transport block sizes based on a quantity of possibly successfully detected LBT bandwidths in the scheduled bandwidth, and preparing a plurality of versions of data respectively corresponding to the plurality of candidate transport block sizes, wherein
the transmitted data is one of the plurality of versions of data determined based on the detection result;
or,
wherein the scheduled bandwidth is greater than or equal to an LBT bandwidth; and
the preparing data according to the scheduling instruction comprises:
if the indication information is used to indicate that the guard band PRB is allowed to be used on the second time domain resource, calculating, on the second time domain resource or a time domain resource after the second time domain resource, a plurality of candidate transport block sizes based on a predicted PRB in the interlace of resource blocks, and preparing a plurality of versions of data corresponding to the plurality of candidate transport block sizes, wherein the predicted PRB is determined based on positions and/or a quantity of possibly detected LBT bandwidths in the scheduled bandwidth; and
the transmitted data is one of the plurality of versions of data determined based on the detection result.

5. The user equipment according to claim 4, wherein the computer program is further executed by the processor to implement:
if the detection result of the clear channel detection indicates that successfully detected listen before talk (LBT) channels comprise adjacent LBT channels, determining that the PRB for data transmission in the interlace of resource blocks comprises a first PRB, wherein the first PRB is a guard band PRB between the adjacent LBT channels.

6. The user equipment according to claim 4, wherein the computer program is further executed by the processor to implement:
　　if the scheduled bandwidth is less than or equal to an LBT bandwidth, disabling the use of the guard band PRB, calculating a transport block size, and preparing data corresponding to the transport block size.

7. A non-transitory computer-readable storage medium, wherein the computer-readable storage medium stores a computer program, and the computer program is executed by a processor to implement:
　　receiving a scheduling instruction transmitted by a network-side device, wherein the scheduling instruction comprises a set of interlace indices of resource blocks and a scheduled bandwidth, and an interlace of resource blocks in the scheduled bandwidth indicated by the set of interlace indices of resource blocks comprises a guard band physical resource block (PRB);
　　performing clear channel detection for the scheduled bandwidth;
　　determining a PRB for data transmission in the interlace of resource blocks based on a detection result of the clear channel detection; and
　　transmitting data by using the PRB for data transmission;
　　wherein a plurality of interlaces of resource blocks are indexed in terms of all PRBs on an entire carrier bandwidth; and
　　the computer program is further executed by the processor to implement:
　　selecting, from the interlace of resource blocks indicated by the set of interlace indices of resource blocks in the entire carrier bandwidth, candidate PRBs in the scheduled bandwidth; and
　　determining the PRB for data transmission from the candidate PRBs based on the detection result of the clear channel detection;
　　wherein before the transmitting data by using the PRB for data transmission, the computer program is further executed by the processor to implement:
　　preparing data according to the scheduling instruction, wherein the prepared data comprises the transmitted data;
　　wherein the scheduling instruction further comprises indication information, and the indication information is used to indicate whether the guard band PRB is allowed to be used;
　　wherein
　　the indication information is used to indicate at least one of the following:
　　the guard band PRB is disabled to be used on a first time domain resource; and
　　the guard band PRB is allowed to be used on a second time domain resource;
　　or
　　the indication information is used to indicate that the guard band PRB is completely disabled to be used;
　　wherein the scheduled bandwidth is greater than or equal to an LBT bandwidth; and
　　the preparing data according to the scheduling instruction comprises:
　　if the indication information is used to indicate that the guard band PRB is disabled to be used on the first time domain resource, or the indication information is used to indicate that the guard band PRB is completely disabled to be used, calculating a plurality of candidate transport block sizes based on a quantity of possibly successfully detected LBT bandwidths in the scheduled bandwidth, and preparing a plurality of versions of data respectively corresponding to the plurality of candidate transport block sizes, wherein
　　the transmitted data is one of the plurality of versions of data determined based on the detection result;
　　or,
　　wherein the scheduled bandwidth is greater than or equal to an LBT bandwidth; and
　　the preparing data according to the scheduling instruction comprises:
　　if the indication information is used to indicate that the guard band PRB is allowed to be used on the second time domain resource, calculating, on the second time domain resource or a time domain resource after the second time domain resource, a plurality of candidate transport block sizes based on a predicted PRB in the interlace of resource blocks, and preparing a plurality of versions of data corresponding to the plurality of candidate transport block sizes, wherein the predicted PRB is determined based on positions and/or a quantity of possibly detected LBT bandwidths in the scheduled bandwidth; and
　　the transmitted data is one of the plurality of versions of data determined based on the detection result.

8. The non-transitory computer-readable storage medium according to claim 7, wherein the computer program is further executed by the processor to implement:
　　if the detection result of the clear channel detection indicates that successfully detected listen before talk (LBT) channels comprise adjacent LBT channels, determining that the PRB for data transmission in the interlace of resource blocks comprises a first PRB, wherein the first PRB is a guard band PRB between the adjacent LBT channels.

9. The non-transitory computer-readable storage medium according to claim 7, wherein the computer program is further executed by the processor to implement:
　　if the scheduled bandwidth is less than or equal to an LBT bandwidth, disabling the use of the guard band PRB, calculating a transport block size, and preparing data corresponding to the transport block size.

10. The method according to claim 1, wherein the indication information is used to indicate that the guard band PRB is disabled to be used on a first time domain resource and that the guard band PRB is allowed to be used on a second time domain resource; and the first time domain resource and the second time domain resource are consecutive time domain resources in time domain.

* * * * *